Jan. 31, 1933. J. B. MAVOR 1,895,551
CONVEYER
Filed July 16, 1932
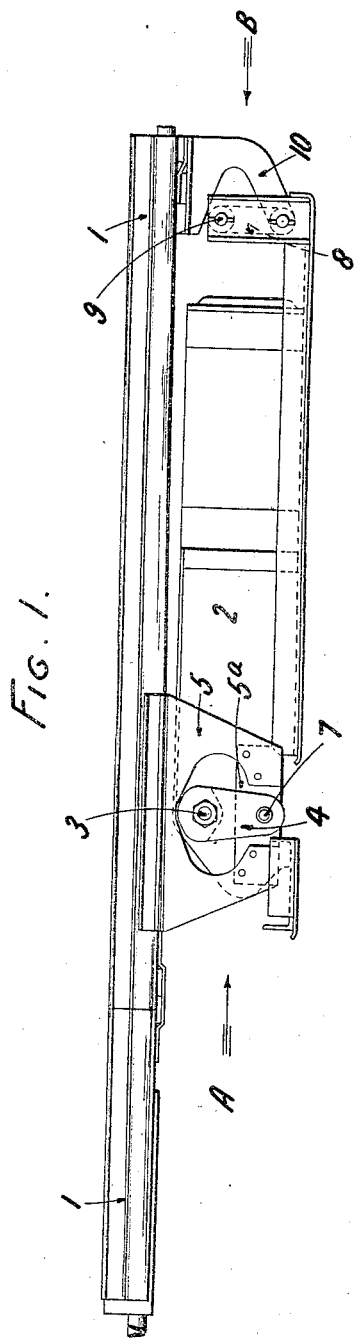
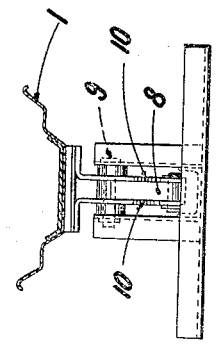
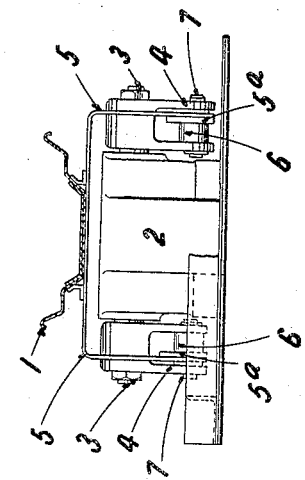
Inventor
John Bridie Mavor
By Dowell & Dowell
Attorneys Patented Jan. 31, 1933

1,895,551

UNITED STATES PATENT OFFICE

JOHN BRIDIE MAVOR, OF MILE END, GLASGOW, SCOTLAND, ASSIGNOR TO MAVOR & COULSONS, LIMITED, OF GLASGOW, SCOTLAND

CONVEYER

Application filed July 16, 1932, Serial No. 622,946, and in Great Britain November 20, 1931.

In conveyers for certain services a requirement of importance frequently is ability to alter the position of the apparatus from time to time, as is the case for example in moving to follow the coal face in mining.

The present invention which relates to conveyers of the shaker or jigging type, has for its object to enable movement such as referred to be effected in an easier and more convenient manner than heretofore. To this end it is arranged that the driving pan of the system of troughing employed shall be supported at opposite ends upon the casing and rocking arms of driving gear such as has been previously used to transmit motion to the troughing through a connecting rod or rods. The connection between the pan aforesaid and the gear box or casing may be such as to produce a lift of the pan and this lift may be the same as that of lifting movement produced by the driving arms.

In the accompanying drawing Fig. 1 is a side elevation of part of a conveyer embodying the invention.

Fig. 2 is an end elevation looking in the direction of the arrow A, Fig. 1, and Fig. 3 is an elevation looking in the direction of the arrow B.

As here shown, 1 indicates the troughing of a shaker conveyer intended to be driven by a driving unit the casing of which is designated 2. The gear of the driving unit comprises a fulcrum shaft 3 having two driving arms 4 situated at opposite sides of the gear box beneath the associated pan or trough section 1 to be driven, said arms being connected to the pan by a saddle 5 having two journal bushes 6 each working on a pin 7 with which the companion rocking arm is provided. The bushes 6 are attached to a plate 5ª forming part of the saddle 5. The said saddle may be riveted to the underside of the pan so as to transmit the drive and the other end of the pan may be carried by a suspension link 8 from a fulcrum 9 beneath the pan which fulcrum is carried by a pedestal attached to the gear casing 2. The lower end of the link 8 is pivoted to the arms 10 of brackets constituting a saddle attached to the pan 1. The fulcrum 9 has the same height of centre as the fulcrum shaft 3 of the driving arms 4 which depend therefrom, and the length of the links 8 is the same as that of the arms 4 so that the motion at the rearward support of the pan is exactly the same as that of the front driven end of the pan.

As will be understood the details of construction may be variously constituted.

What I claim is:—

1. In a conveyer of the kind referred to, a gear box comprising two driving arms one situated at each side of the box and downwardly directed, a trough pan above the gear box and a saddle attached to the pan pivotally connected to the lower ends of the driving arms.

2. In a conveyer of the kind referred to, a gear box comprising two driving arms one situated at each side of the box and downwardly directed, a trough pan above the gear box, a saddle attached to the pan and pivotally connected to the lower ends of the driving arms, a pedestal associated with the gear box so as to move therewith, brackets upon the pan located adjacent to said pedestal and a link suspension connecting the brackets and pedestal together.

3. Means according to claim 2 in which the length of the link suspension equals the length of the driving arms.

Signed at Glasgow, Scotland, this seventeenth day of May 1932.

JOHN BRIDIE MAVOR.

CERTIFICATE OF CORRECTION.

Patent No. 1,895,551.                                          January 31, 1933.

JOHN BRIDIE MAVOR.

It is hereby certified that the name of the assignee in the above numbered patent was erroneously described and specified as "Mavor & Coulsons, Limited", whereas said name should have been described and specified as "Mavor & Coulson Limited", as shown by the records of assignments in this office; and that the said Letters Patent should be read with this correction therein that the same may conform to the record of the case in the Patent Office.

Signed and sealed this 2nd day of May, A. D. 1933.

M. J. Moore,

Acting Commissioner of Patents.

(Seal)